United States Patent [19]

Rothbauer

[11] 4,048,397
[45] Sept. 13, 1977

[54] METHOD AND APPARATUS FOR INTERCONNECTING STACKED ELECTRODES OF BATTERIES

[75] Inventor: Horst Rothbauer, Sarnen, Switzerland

[73] Assignee: Maxs AG, Wilen-Sarnen, Switzerland

[21] Appl. No.: 634,548

[22] Filed: Nov. 24, 1975

Related U.S. Application Data

[63] Continuation-in-part of Ser. No. 541,946, Jan. 17, 1975, abandoned.

[51] Int. Cl.² ............................................ H01M 2/18
[52] U.S. Cl. .................................. 429/131; 29/623.1; 429/144; 429/153
[58] Field of Search ..................... 136/111, 134 P, 145, 136/146, 175; 429/131, 144, 153; 29/623.1

[56] References Cited

U.S. PATENT DOCUMENTS

| | | | |
|---|---|---|---|
| 2,727,082 | 12/1955 | Chubb et al. | 136/111 |
| 2,880,259 | 3/1959 | Nowotny | 136/175 |
| 3,169,889 | 2/1965 | Zahn | 136/175 |
| 3,287,163 | 11/1966 | Steffens | 136/134 P |

Primary Examiner—Donald L. Walton
Attorney, Agent, or Firm—Frederick E. Bartholy

[57] ABSTRACT

Electrodes utilized in various types of batteries are interconnected by means of a pair of conductive bands insulated from each other and bent into a zig-zag formation. Each conductive band overlays an electrode of one polarity, thus performing the function of separator as well as terminal conductor. Upon compression of the stacked electrodes into a housing, a compact battery is produced.

5 Claims, 7 Drawing Figures

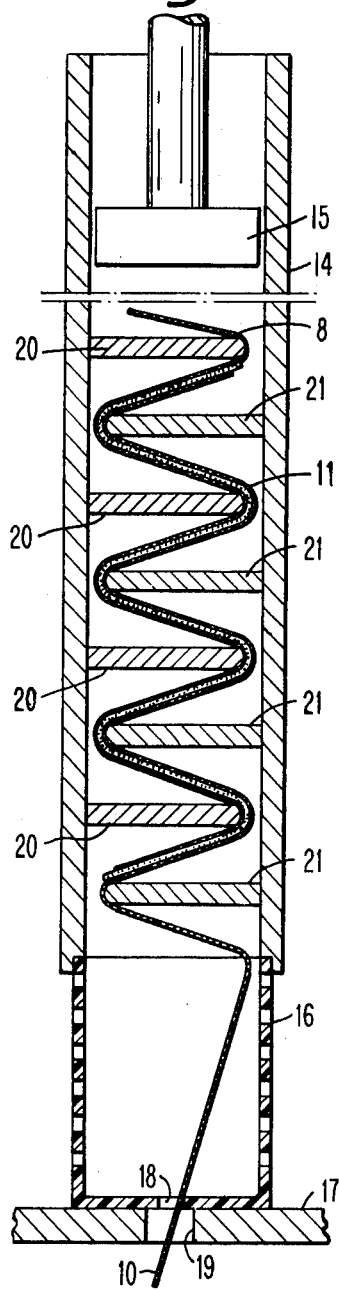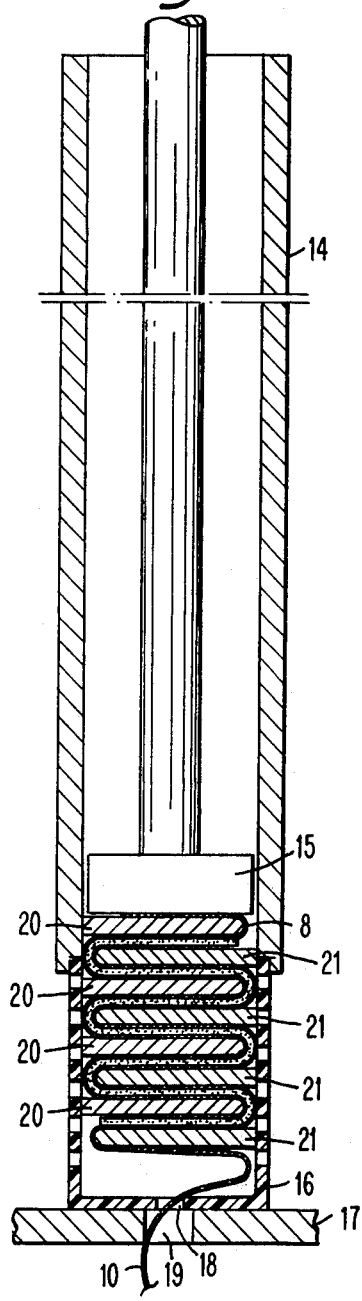

METHOD AND APPARATUS FOR INTERCONNECTING STACKED ELECTRODES OF BATTERIES

This application is a continuation-in-part of my pending application, Ser. No. 541,946, filed on Jan. 17, 1975, now abandoned.

The invention herein described is directed to the assembling and stacking of electrodes for various types of batteries to form a voltaic pile or storage cell.

In the construction of batteries having a plurality of electrodes, it is essential to interconnect electrodes of one polarity and, in the same manner, electrodes of the opposite polarity. This requires considerable time-consuming manual labor. Moreover, in batteries utilizing a number of electrodes, it is essential to provide insulating separators between them which represent additional assembly time.

It is a particular object of the invention that the above-mentioned assembly steps be simplified and practically eliminated.

It is a particular feature of the invention that the separators and interconnecting conductors are permanently joined together and form an integral part of the assembly.

A particular advantage of the invention resides in the fact that stacking of the electrodes and the interconnection thereof may be effected by a simple mechanism.

Other objects, features, and advantages will be apparent from the following description of the invention, pointed out in particularity in the appended claims and taken in connection with the accompanying drawings, in which:

FIG. 5 is a view taken along line 5—5 of FIG. 4 with the components in place ready for compression.

FIG. 6 is a view similar to that of FIG. 5 showing the components partially compressed into a cylindrical housing.

In the manufacture of batteries of certain types, a number of electrodes must be stacked into housings of selected shapes. In general, batteries of the common variety are of cylindrical shape and may utilize electrodes of diverse composition as well as electrolytes suitable therefor. The present invention is not concerned with the battery, per se, and neither is the composition of the electrodes within the domain of the invention. The latter is directed solely to the assembly of the type of batteries which utilize a plurality of electrodes stacked one on top of another in a particular housing.

The invention is directed foremost to the stacking and interconnection of electrodes in a practical and novel manner — in other words, a simple, efficient, and time-conserving way to assemble such batteries, resulting in a compact, fabricated unit.

REFERRING TO THE FIGURES

Figure 1:
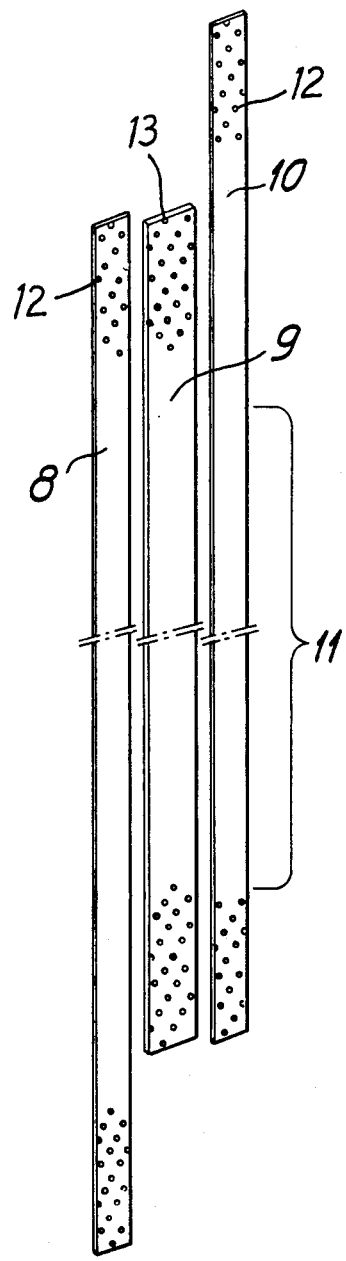
FIG. 1 is a plan view of a composite separator and interconnecting strip joined together to form a band.

In FIG. 1, a combined separator and connector element consists of a conductive strip 8, an insulating strip 9, and another conductive strip 10 placed lengthwise, one above the other, to form a band 11. The conductive strips 8 and 10 extend in length beyond that of the insulating strip 9. The latter is sandwiched between them and secured by suitable pressing or gluing so that the assembly is an inseparable unit which may be bent in any direction without disturbing their relationship. This is an important feature of the invention and the reason for it will be understood later on upon describing its function in the construction of a battery.

Figure 2:
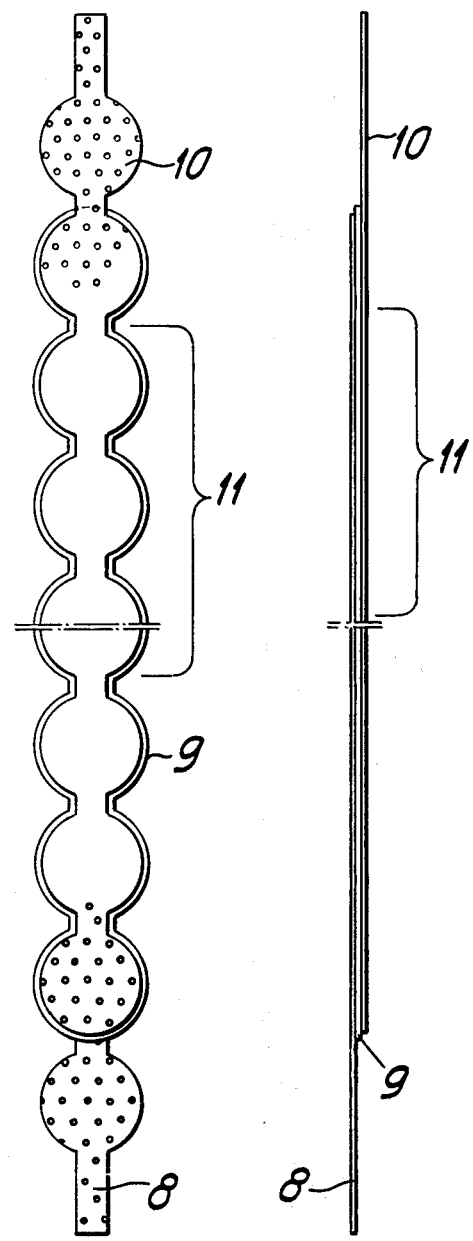
FIG. 2 is a plan view of a modified form of an interconnecting and separator band.

The conductive strips 8 and 10 are made of such metals which are not affected by the particular electrolyte used in the battery. These could be of stainless steel, nickel, etc. In FIGS. 1 and 2, the strips 8 and 10 have perforations 12. For the sake of simplicity, only a few of these perforations are shown in the figures. It is, of course, understood that such perforations cover the entire length thereof.

Similarly, the separator strip 9 has perforations 13 in order to be permeable to the electrolyte and provide an ionic path for the battery operation. The insulating strip 9 may be of rubber, plastics of various types which are not electrically conductive.

Figure 3:
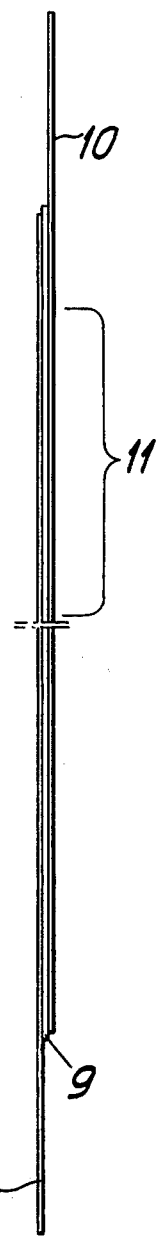
FIG. 3 is a side view of the band shown in FIG. 1.

While FIGS. 1, 2 and 3 illustrate solid conductive strips 8 and 10 with perforations, it is also possible to use mesh type strips which permit penetration of the electrolyte. The same holds true for the insulating strip 9. The underlying idea is that the strips form solid bands 11 which can be bent into a zig-zag formation which is the gist of the invention, permitting quick and easy assembly of any number of electrodes of a battery. The invention, as will be seen, is not directed to any particular battery, per se, but the method of assembly of the component parts thereof.

It is to be understood that the "battery", in connection with this invention, is of the type which utilizes a plurality of distinct electrodes in the form of disks or plates which must be placed one above the other to form a stack. These electrodes require not only electrical separation between each other, i.e., one may not touch the other without having an insulating medium between them, but they must also be electrically so interconnected that electrodes representing one polarity are conductively brought out to one electrical terminal of the battery and electrodes of the opposite polarity are similarly conductively interconnected to the other electrical terminal of the battery.

Ordinarily, this would require the placement of an insulating medium between each electrode so that they do not touch each other, and also an electrically conductive medium so that only electrodes of one polarity are electrically connected to each other throughout the number of electrodes stacked one on top of the other, representing one polarity of the pile. Similarly, electrodes of the opposite polarity must be interconnected, representing the other polarity of the pile. It is readily seen that such interconnections and electrically-insulated separations would be an extremely tedious and time-consuming operation.

As will be seen in connection with the description of the remaining figures, such an assembly may be speedily effected with ease by the use of the bands 11 shown in FIGS. 1, 2 and 3.

Figure 4:
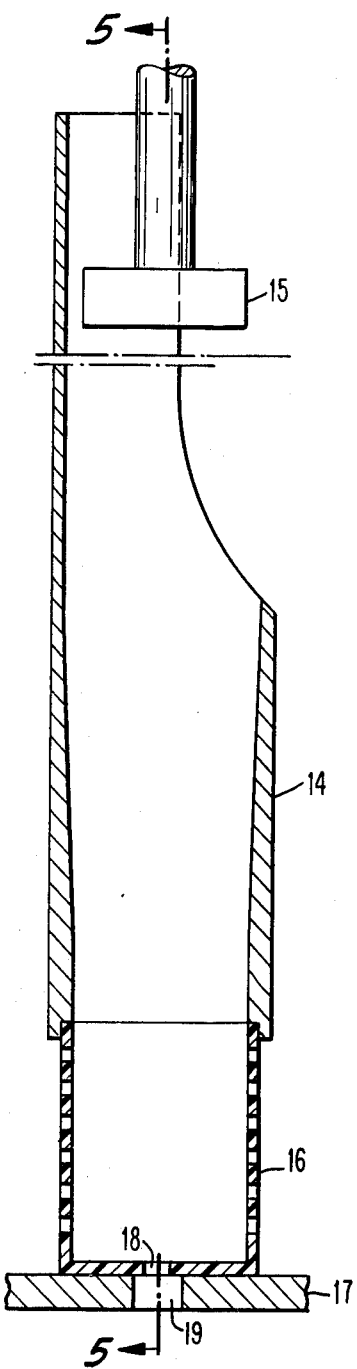
FIG. 4 is a partial sectional view of a simple apparatus used for the assembly of the electrodes for a battery into a housing.

Considering FIG. 4, it shows the essential elements of a simple device for assembling the electrodes of a battery. It consists of a tubular structure 14 which accommodates a loosely fitting piston 15. The bottom part of the structure 14 fits over a cylindrical insulating container 16 placed above a platform 17. The container 16, as well as the platform 17, have coaxially aligned openings 18 and 19, respectively, for providing space for the terminal connector. The reason for this will be understood upon further description of the assembly steps. The container 16 represents the inner housing of a battery.

The first assembly step is illustrated in FIG. 5. The band 11 is bent into a zig-zag shape or accordian formation and the electrodes 20 inserted between "hill and dale" portions of the band 11 and the electrodes 21 are placed between alternate "hill and dale" portions. A length of the conductive strip 10 of the band 11 is brought out through the openings 18 and 19. This is quite a simple procedure.

After the assembly shown in FIG. 5 is completed, the piston 15 is moved downwardly so as to compress the loosely placed electrodes 20 and 21 together with the zig-zag formation band 11.

The compression of the stacked electrodes 20 and 21 as illustrated in FIG. 6 is not entirely completed. It is shown in the process of completion, i.e., when the entire assembly is passed into the housing 16.

It is seen that due to compression, the zig-zag formation of the band 11 has resulted in overlapping each of the electrodes 20 and 21, respectively. Each of the electrodes 20, is interconnected by the conductive strip 8 and each of the electrodes 21 is interconnected by the conductive strip 10. In other words, all electrodes 20, representing one polarity, are conductively interconnected and, similarly, all electrodes 21, of the opposite polarity, are also interconnected. All this is accomplished by the simple operation of pressing down on the piston 15, thereby compressing the stack of electrodes into the housing 16. Moreover, by the same operation, utilizing the band 11 which includes an insulating layer 9, all electrodes 20 are electrically separated from electrodes 21, thus preventing conductive contact between them.

Figure 7:
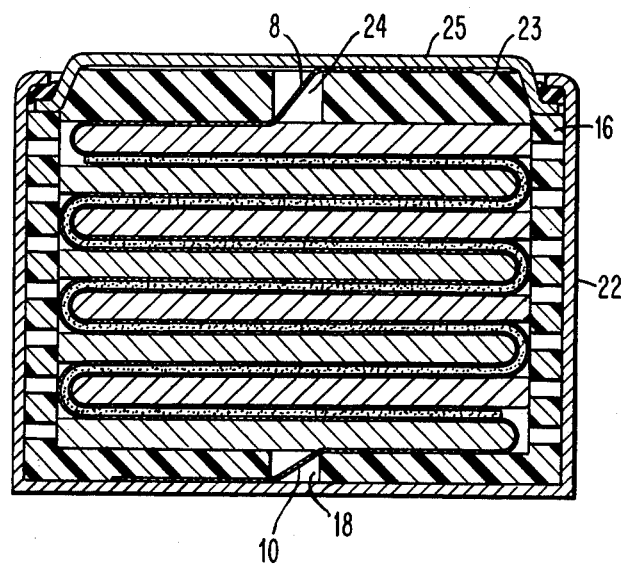
FIG. 7 is a sectional view of a completed battery.

The completed battery is illustrated in a cross sectional view in FIG. 7. The insulating housing 16 is now placed in a metallic shell 22. Over this assembly is placed an insulating cover 23 having a central opening 24. A metallic cap 25 is placed over the cover 23. It is to be noted that the conductive strip 8 is brought out through the opening 24 and is in firm contact with the cap 25, being folded over the bottom wall of the cover 23. Thus one pole of the battery becomes the cover 25.

On the bottom of the battery, the conductive strip 10 is similarly brought out through the aperture 18 and contacts the inner wall at the bottom of the shell 22 so that the latter becomes the other pole of the battery.

The simplicity and efficiency of the assembly now becomes evident. In one operation, by the use of a band 11, a plurality of electrodes of whatever shape or form are insulated from each other and, at the same time, conductively interconnected selectively as to relative polarities. Not only is this a time-saving operation in assembling various types of batteries, but manifestly represents a great saving in cost.

This invention in its broader aspects is not limited to the specific embodiments herein shown and described but departure may be made within the scope of the accompanying claims, without departing from the principles of the invention and without sacrificing its chief advantages.

What is claimed is:

1. The method of assembling and interconnecting a plurality of electrodes to form a battery which comprises placing a band consisting of a pair of electrolyte permeable conducting strips separated by a permeable insulating strip in zig-zag formation around a plurality of electrodes in such manner that each electrode of one polarity is enveloped by one conductive strip of said band and each electrode of the opposite polarity is enveloped by the other conductive strip of said band and pressing said electrodes together to form a stacked assembly.

2. The method in accordance with claim 1 wherein said electrodes are placed in a tubular structure having a piston, said structure being placed over an insulating housing accommodating said electrodes, stacking of said electrodes into said housing being effected by exerting compressive force on said piston.

3. The method in accordance with claim 2 wherein, upon compression of said piston, said housing is removed for placement in a metallic shell, one of said conductive strips, emerging at one end, engaging said shell and causing the latter to become one polarity of a battery, and the other of said conductive strips emerging at the other end, representing the other polarity of said battery.

4. Interconnecting and insulating means for electrodes of diverse polarity place one above the other, comprising a band consisting of a length of a conductive strip, a length of an insulating strip, and another length of a conductive strip, said insulating strip being firmly secured between said conductive strips, permitting deformation of said band without disturbing the relative position between said conductive strips and said insulating strip, said band being flexible for placement in zig-zag formation over said electrodes and permeable to the electrolyte by virtue of perforations throughout its length.

5. Interconnecting the insulating means in accordance with claim 4 wherein one of said conducting strips extends beyond said insulating strip at one end and the other of said conducting strips extends beyond said insulating strip at the other end.

* * * * *